Figure 1:
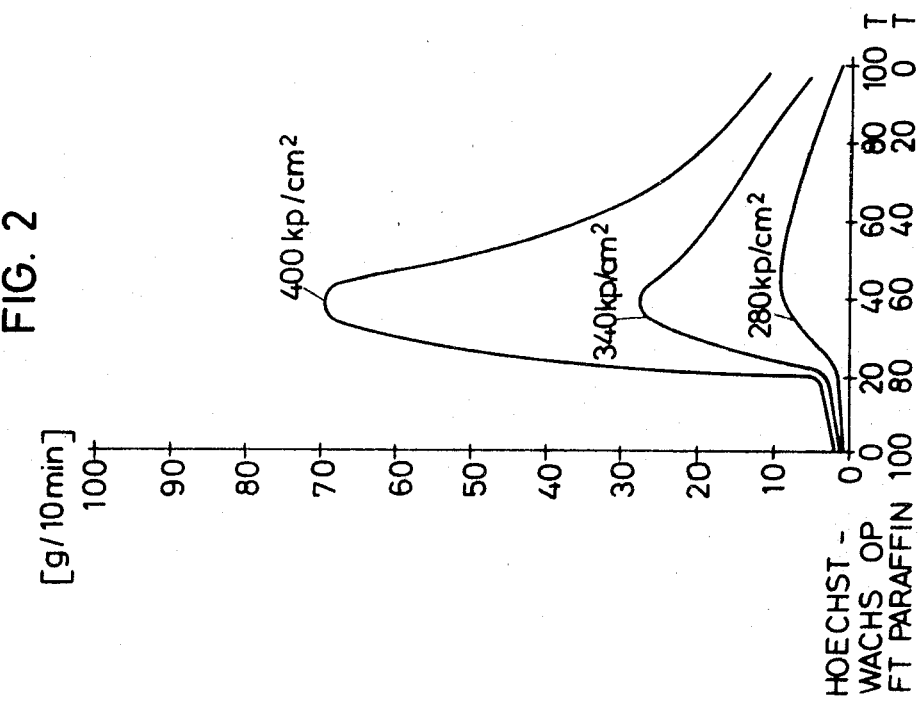

United States Patent
Brotz et al.

[15] 3,640,828
[45] Feb. 8, 1972

[54] LUBRICANT COMPOSITIONS FOR MASSES OF POLYVINYL CHLORIDE AND PROCESS FOR MAKING SAME

[72] Inventors: Walter Brotz, Gersthofen; Bruno Dallmann, Augsburg, both of Germany

[73] Assignee: Farbwerke Hoechst Aktiengesellschaft Vormals Meister Lucius & Bruning, Frankfurt/Main, Germany

[22] Filed: Oct. 17, 1968

[21] Appl. No.: 768,384

[30] Foreign Application Priority Data

Oct. 21, 1967 Germany.....................F 53 864

[52] U.S. Cl................................252/17, 252/35, 252/37, 252/39, 252/40.5, 252/56 S, 252/59, 264/177
[51] Int. Cl...................................C10m 7/24, C10m 7/22
[58] Field of Search.................252/39, 17, 56 S, 59, 40.5, 252/35, 37; 264/177

[56] References Cited

UNITED STATES PATENTS

| | | | |
|---|---|---|---|
| 2,624,914 | 1/1953 | Rhodes | 264/177 |
| 3,242,075 | 3/1966 | Hunter | 252/59 |
| 3,446,749 | 5/1969 | Weisfeld et al. | 252/400 |

FOREIGN PATENTS OR APPLICATIONS 973,959   11/1964   Great Britain..........................252/39

Primary Examiner—Daniel E. Wyman
Assistant Examiner—I. Vaughn
Attorney—Connolly & Hutz

[57] ABSTRACT

For the processing of masses of polyvinyl chloride lubricant compositions are proposed which consist of 20 to 80 percent by weight of a metal soap or synthetic ester wax containing metal soap and 80 to 20 percent by weight of a hydrocarbon wax and which enable a particularly high output of plastics material and consequently an increased speed of processing to be obtained, for example, in injection-moulding processes.

2 Claims, 6 Drawing Figures

3,640,828

LUBRICANT COMPOSITIONS FOR MASSES OF POLYVINYL CHLORIDE AND PROCESS FOR MAKING SAME

The present invention relates to lubricant compositions for masses of polyvinyl chloride and a process for making them.

For processing polyvinyl chloride containing a plasticizer or free from plasticizer on calenders or extruders or by injection moulding it is necessary to add lubricants to improve flow and thermostability. The lubricants serve to reduce internal friction of the mass and to produce a lubricating film on the metal surfaces of the processing machines thus ensuring improved flow, smooth surfaces and the absence of flow lines and pores. They also serve to prevent the plastics material from sticking, for example, to the calender rolls or extruder nozzles. With the help of all these properties taken together it is intended to obtain a higher speed of production due to improved flow, that is as high an output as possible.

As described in "British Plastics," vol. 34(1961), pages 328 to 333 and "Gummi-Asbest-Kunststoffe," Vol. 18 (1965), pages 425 to 433, various lubricants have already been proposed for this purpose, for example fatty acids or the esters and salts thereof, fatty acid amides, fat alcohols, synthetic ester waxes based on commercial montanic acid, hydrocarbon waxes such as petroleum paraffins, synthetic paraffins and polyethylene waxes or the oxidation products thereof. Polyglycols and their esters have also been proposed. All these products meet the requirements made on them at relatively low speeds of production, but have proved unsatisfactory when it is intended to obtain higher rates of output. Synthetic ester waxes still yield the best results although they must be used in relatively large amounts.

Now we have found that the flow of masses of polyvinyl chloride and consequently the speed of processing as well as the output can be considerably improved by using, as lubricant, compositions consisting of 20 to 80 percent by weight of a metal soap and/or a wax containing a metal soap and 80 to 20 percent by weight of a hydrocarbon wax.

The term "metal soaps" is used here to mean salts of alkaline earth metals, of zinc, cadmium, tin or lead with aliphatic, advantageously saturated fatty or wax acids containing 16 to 36 carbon atoms, for example, calcium stearate, lead stearate, zinc behenate, calcium montanate of mixtures thereof. By waxes containing metal soaps there are meant synthetic waxes that already contain one or more of the above soaps, for example HOECHST-WACHS$^{(R)}$ GL3, the so-called ester waxes containing soaps which have been obtained by oxidation of crude montan wax and subsequent partial saponification and esterification as, for example, HOECHST-WACHS$^{(R)}$ OP. The said ester waxes containing soaps are particularly appropriate. It is also possible to use any mixtures of the said metal soaps and waxes containing metal soaps.

By hydrocarbon waxes there are meant paraffin waxes of a molecular weight within the range of from about 500 to 1,500, for example the known paraffins obtained by the Fischer-Tropsch-synthesis, polyolefin waxes of a molecular weight within the range of from about 1,500 to 20,000. Polyethylene waxes of a molecular weight within the range of from 1,800 to 15,000 yield particularly good results. Mixtures of different paraffin waxes or polyolefin waxes or mixtures of paraffin waxes with polyolefin waxes may also be used.

The lubricant compositions of the invention, containing 20 to 80 percent, advantageously 40 to 60 percent by weight metal soap or wax containing metal soaps and 80 to 20, preferably 60 to 40 percent by weight hydrocarbon wax are advantageously used for the processing of polyvinyl chloride or mixtures containing polyvinyl chloride as the main resin constituent, for example mixtures of rigid and plasticized polyvinyl chloride containing a filler or not, or copolymers of polyvinyl chloride. The amount of lubricant required depends on the nature of the plastics material to be processed and the desired rate of output and is generally within the range of from 0.3 to 5 percent, preferably 1 to 2 percent, calculated on the weight of the thermoplast.

The highly effective compositions in accordance with the invention may also be used in admixture with the above known lubricants, for example, fatty acid esters. This is particularly advantageous when it is intended to obtain special effects, for example, an increased transparency.

The following examples serve to illustrate the invention, but are not intended to limit it, the parts being by weight.

The following examples show that the lubricant compositions of the invention enable a considerably improved output of plastics material to be obtained, as compared with the same amount of the individual components. In other words, the inventive compositions show synergy.

EXAMPLE 1

Two percent weight of a lubricant composition consisting of a synthetic ester wax containing a metal soap (HOECHST-WACHS$^{(R)}$ OP) and a polyethylene wax of a molecular weight of about 2,000 in different mixing ratios was added in each case to a polyvinyl chloride of a K value of 70, obtained by suspension polymerization and containing a tin stabilizer. The output was determined in grams per 10 minutes in a high pressure capillary viscometer at 180° C. and with mass pressures of 280, 340 and 400 kp./cm.$^2$, respectively, while using a nozzle L/D 15.

The results ascertained are indicated in the following Table 1 and represented diagrammatically in FIG. 1 of the accompanying drawings to better demonstrate the effects obtained.

TABLE 1

| Ester wax containing soap, percent (Hoechst-Wachs® OP) | Polyethylene wax molecular weight about 2,000 percent | Output in g./10 min. at a pressure of— | | |
|---|---|---|---|---|
| | | 280 kp./cm.$^2$ | 340 kp./cm.$^2$ | 400 kp./cm.$^2$ |
| 2.0 | 0.0 | 2.2 | 5.2 | 11.0 |
| 1.6 | 0.4 | 19.0 | 44.0 | 79.0 |
| 1.2 | 0.8 | 29.0 | 58.0 | 100.0 |
| 0.8 | 1.2 | 24.0 | 50.0 | 87.6 |
| 0.4 | 1.6 | 2.3 | 7.0 | 17.0 |
| 0.0 | 2.0 | 1.1 | 2.1 | 5.1 |

EXAMPLE 2

Under the conditions described in Example 1, 2 percent by weight of a mixture consisting of a synthetic ester wax containing a metal soap (HOECHST-WACHS$^{(R)}$OP) and a paraffin obtained by the Fisher-Tropsch-synthesis and having a melting point of 101° to 103° C. in different mixing ratios, was added in each case and the output was determined in a high pressure capillary viscometer.

Figure 2:
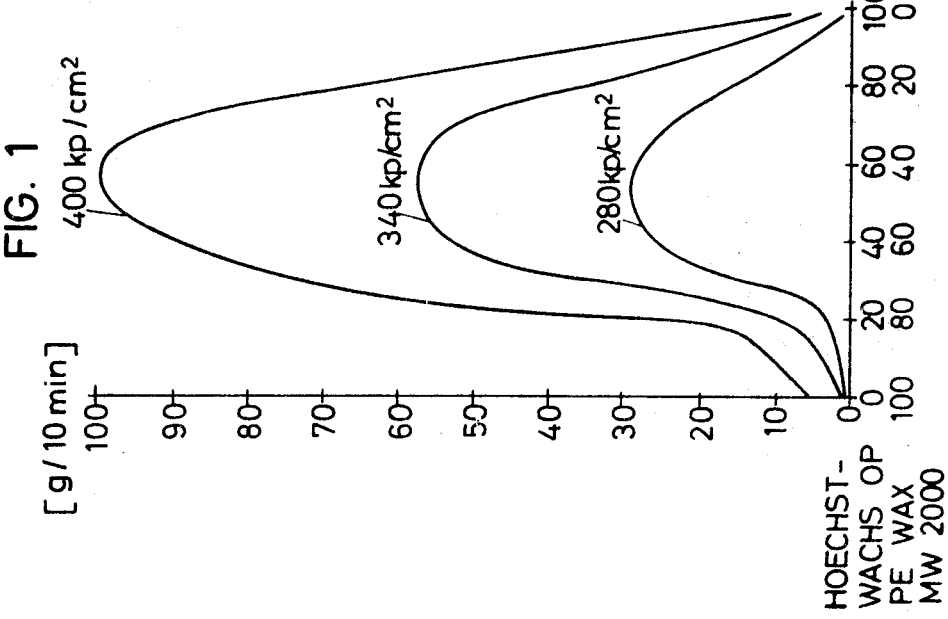

The results ascertained are indicated in the following Table 2 and represented diagrammatically in FIG. 2 of the accompanying drawings.

TABLE 2

| Ester wax containing soap, percent (Hoechst-Wachs® OP) | Paraffin obtained by FT-synthesis, percent, melting point 101/103° C. | Output in g./10 min. at a pressure of — | | |
|---|---|---|---|---|
| | | 280 kp./cm.$^2$ | 340 kp./cm.$^2$ | 400 kp./cm.$^2$ |
| 2.0 | 0.0 | 2.2 | 5.2 | 11.0 |
| 1.6 | 0.4 | 6.0 | 13.0 | 20.0 |
| 1.2 | 0.8 | 8.4 | 19.0 | 34.0 |
| 0.8 | 1.2 | 9.0 | 28.0 | 70.0 |
| 0.4 | 1.6 | 1.6 | 2.4 | 4.0 |
| 0.0 | 2.0 | 0.6 | 1.0 | 1.6 |

EXAMPLE 3

Under the conditions of Example 1, 2 percent by weight of mixtures of calcium stearate with a polyethylene wax of a molecular weight of about 9,000 were added and the output was determined in a high pressure capillary viscometer.

Figure 3:
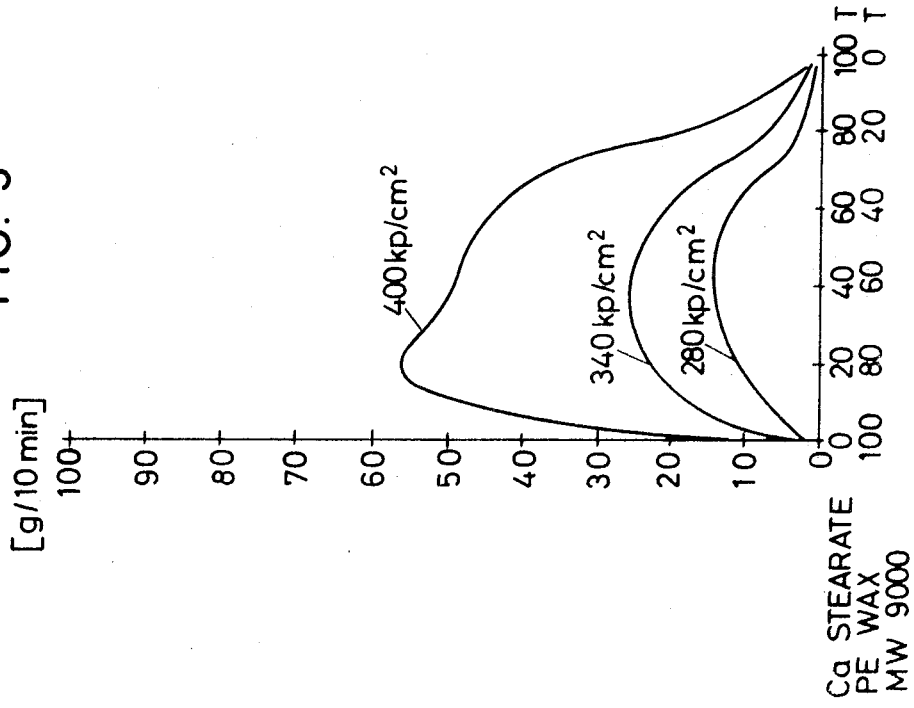

The results obtained are shown in the following Table 3 and in FIG. 3 of the accompanying drawings.

TABLE 3

| Calcium stearate, percent | Polyethylene wax molecular weight about 9,000, percent | Output in g./10 min. at a pressure of— | | |
|---|---|---|---|---|
| | | 280 kp./cm.² | 340 kp./cm.² | 400 kp./cm.² |
| 2.0 | 0.0 | 1.4 | 2.0 | 2.8 |
| 1.6 | 0.4 | 3.0 | 7.8 | 23.0 |
| 1.2 | 0.8 | 12.0 | 22.0 | 44.0 |
| 0.8 | 1.2 | 14.0 | 25.0 | 48.0 |
| 0.4 | 1.6 | 11.0 | 23.0 | 56.0 |
| 0.0 | 2.0 | 2.2 | 3.6 | 9.6 |

EXAMPLE 4

Figure 4:
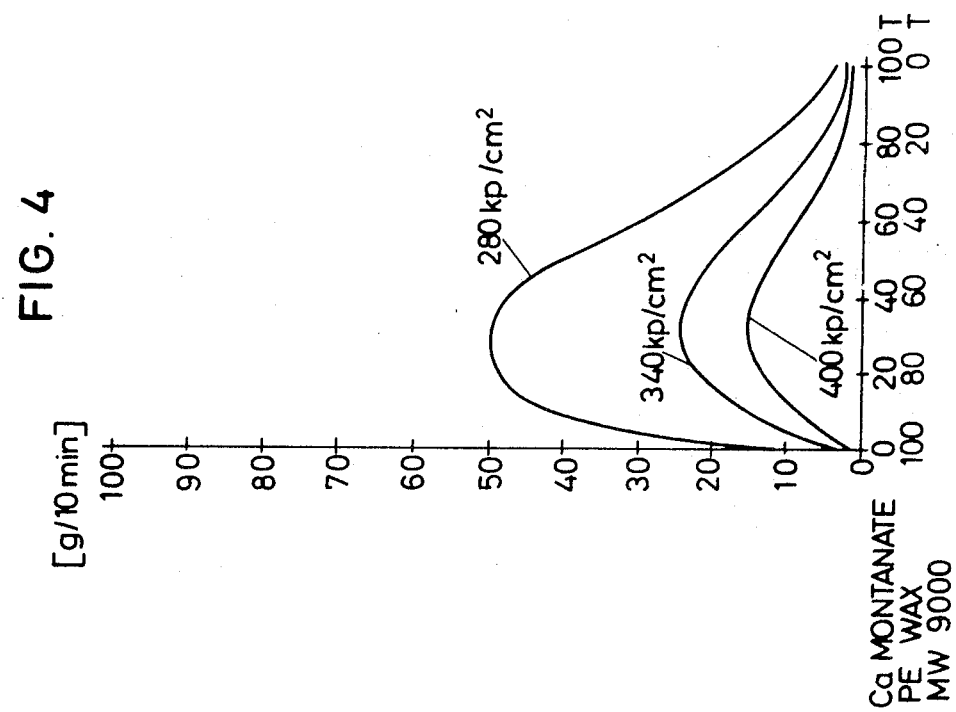

Under the conditions described in Example 1, 2 percent of mixtures of calcium montanate with a polyethylene wax of a molecular weight of about 9,000 was added and the output was measured in a high pressure capillary viscometer. The results obtained are shown in the following Table 4 and in FIG. 4 of the accompanying drawings.

TABLE 4

| Calcium montanate, percent | Polyethylene wax molecular weight about 9,000, percent | Output in g./10 min. at a pressure of— | | |
|---|---|---|---|---|
| | | 280 kp./cm.² | 340 kp./cm.² | 400 kp./cm.² |
| 2.0 | 0.0 | 1.8 | 2.4 | 3.8 |
| 1.6 | 0.4 | 3.3 | 6.0 | 14.0 |
| 1.2 | 0.8 | 9.3 | 16.0 | 31.0 |
| 0.8 | 1.2 | 15.0 | 23.0 | 48.0 |
| 0.4 | 1.6 | 13.0 | 22.0 | 49.0 |
| 0.0 | 2.0 | 2.2 | 3.6 | 9.6 |

EXAMPLE 5

One percent by weight of a mixture consisting of a synthetic wax containing a metal soap (HOECHST-WACHS$^{(R)}$GL3) and a polyethylene wax of a molecular weight of about 2,000 was added in each case to a mixture of 70 parts of a polyvinyl chloride obtained by suspension polymerization, 30 parts of dioctylphthalate and a tin stabilizer. The output was determined in g./10 min. in a high-pressure capillary viscometer at 150° C. and mass pressures of 280, 340 and 400 kp./cm.², respectively, while using a nozzle LD 30.

Figure 5:
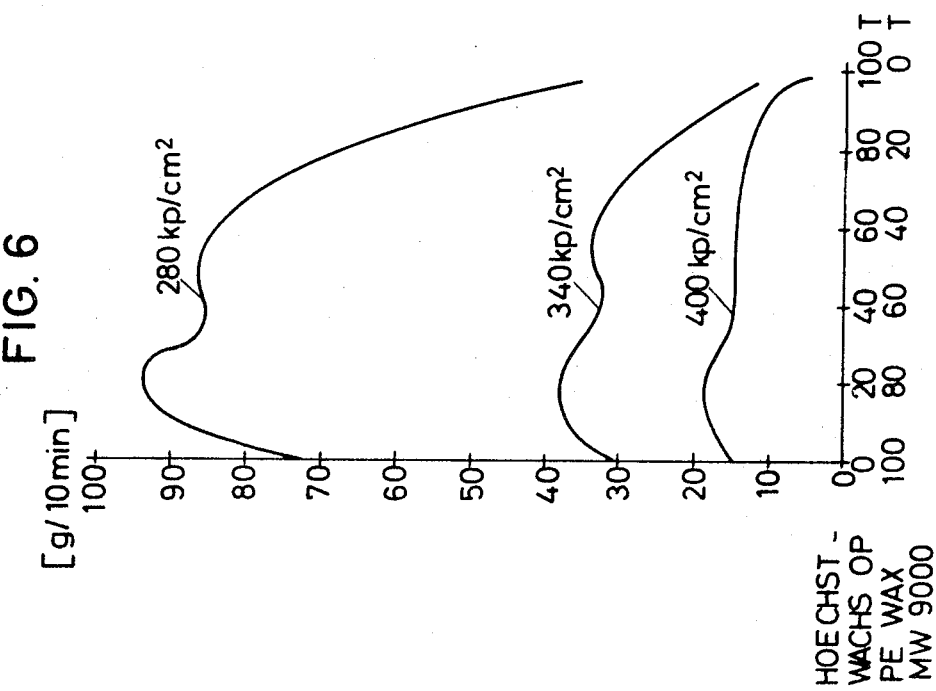

The results obtained are shown in the following Table 5 and in FIG. 5 of the accompanying drawing.

EXAMPLE 6

Under the conditions described in Example 5, 1 percent by weight of a mixture of a synthetic ester wax containing a metal soap (HOECHST-WACHS$^{(R)}$OP) and a polyethylene wax of a molecular weight of about 9,000 was added in each case and the output was determined in a high-pressure capillary viscometer.

TABLE 5

| Ester wax containing soap, percent (Hoechst-Wachs® GL3) | Polyethylene wax molecular weight about 2,000 percent | Output in g./10 min. at a pressure of | | |
|---|---|---|---|---|
| | | 280 kp./cm.² | 340 kp./cm.² | 400 kp./cm.² |
| 1.0 | 0.0 | 2.6 | 5.8 | 17.0 |
| 0.8 | 0.2 | 3.8 | 8.0 | 24.0 |
| 0.6 | 0.4 | 4.0 | 9.0 | 29.0 |
| 0.4 | 0.6 | 4.0 | 9.4 | 30.0 |
| 0.2 | 0.8 | 4.2 | 11.0 | 39.0 |
| 0.0 | 1.0 | 3.6 | 9.0 | 29.0 |

Figure 6:
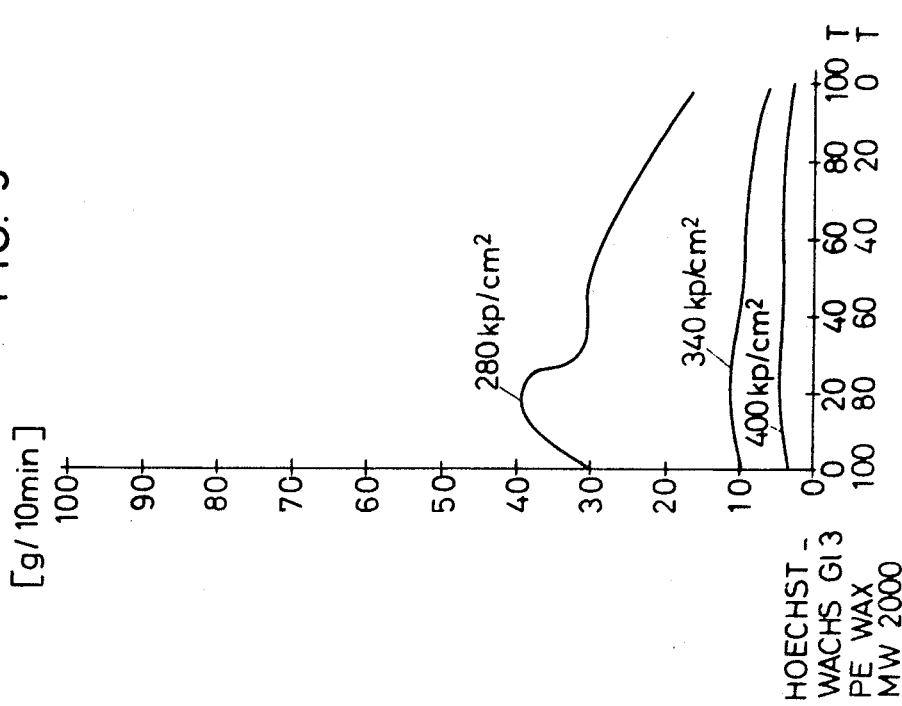

The results obtained are shown in the following Table 6 and in FIG. 6 of the accompanying drawings.

TABLE 6

| Ester wax containing soap, percent (Hoechst-Wachs® OP) | Polyethylene wax molecular weight about 9,000 percent | Output in g./10 min. at a pressure of— | | |
|---|---|---|---|---|
| | | 280 kp./cm.² | 340 kp./cm.² | 400 kp./cm.² |
| 1.0 | 0.0 | 5.0 | 12.0 | 36.0 |
| 0.8 | 0.2 | 13.0 | 27.0 | 73.0 |
| 0.6 | 0.4 | 15.0 | 33.0 | 85.0 |
| 0.4 | 0.6 | 15.0 | 33.0 | 85.0 |
| 0.2 | 0.8 | 19.0 | 38.0 | 94.0 |
| 0.0 | 1.0 | 15.0 | 30.0 | 71.0 |

What is claimed is:

1. A process for processing polyvinyl chloride which comprises calendering, extruding, or moulding polyvinyl chloride containing synergistic proportions of:
   a. a material selected from the group consisting of a soap of an aliphatic saturated fatty or wax acid having 16 to 36 carbon atoms and a metal selected from the group consisting of alkaline earth metals, zinc, cadmium, tin, and lead, and a synthetic ester containing at least one of said soaps, or both and
   b. a hydrocarbon wax selected from the group consisting of paraffin wax having a molecular weight of 500 to 1,500 and polyethylene having a molecular weight of 1,500 to 20,000 or both.

2. The lubricant compositions for the processing of masses of polyvinyl chloride consisting of synergistic proportions of:
   a. a material selected from the group consisting of a soap of an aliphatic saturated fatty or wax acid having 16 to 36 carbon atoms and a metal selected from the group consisting of alkaline earth metals, zinc, cadmium, tin, and lead, and a synthetic ester wax containing at least one of said soaps, or both and
   b. a hydrocarbon wax selected from the group consisting of paraffin wax having a molecular weight of 500 to 1,500 and polyethylene having a molecular weight of 1,500 to 20,000 or both.

* * * * *